Dec. 20, 1932.  J. A. MAURER, JR  1,891,389
REPRODUCTION OF SOUND
Filed Oct. 28, 1931  5 Sheets-Sheet 1

INVENTOR
JOHN A. MAURER Jr.
BY
ATTORNEY

Dec. 20, 1932.    J. A. MAURER, JR    1,891,389
REPRODUCTION OF SOUND
Filed Oct. 28, 1931    5 Sheets-Sheet 2

INVENTOR
JOHN A. MAURER JR.
BY
ATTORNEY

Dec. 20, 1932. J. A. MAURER, JR 1,891,389
REPRODUCTION OF SOUND
Filed Oct. 28, 1931   5 Sheets-Sheet 3
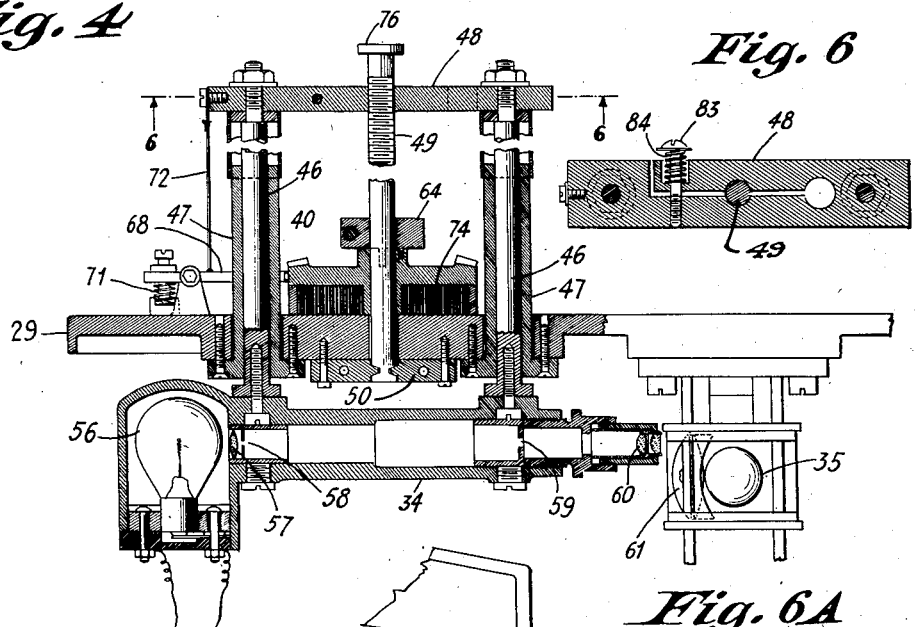
Fig. 4
Fig. 6
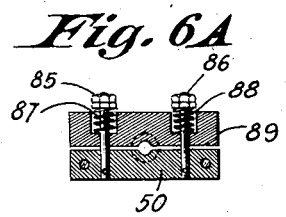
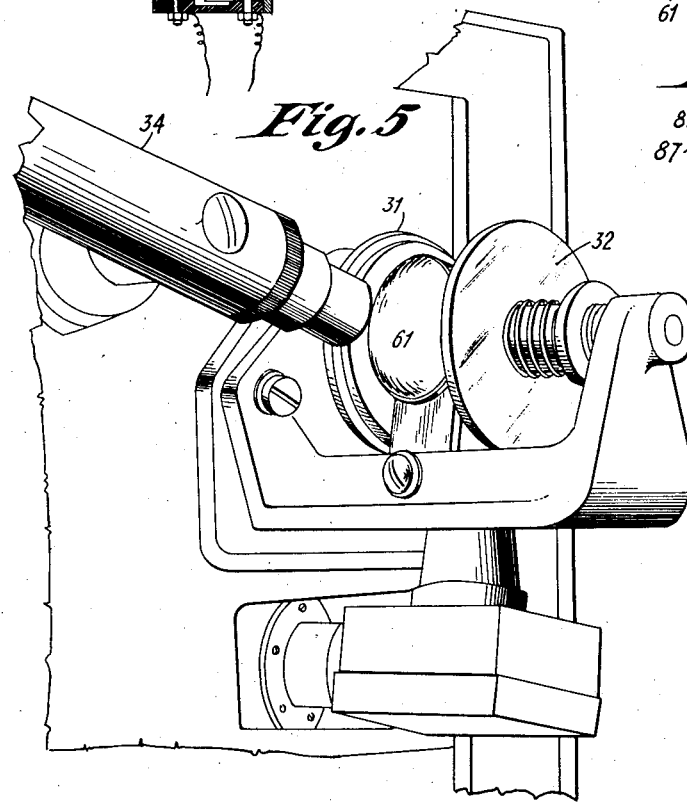
Fig. 5
Fig. 6A
INVENTOR
JOHN A. MAURER JR.
BY
ATTORNEY

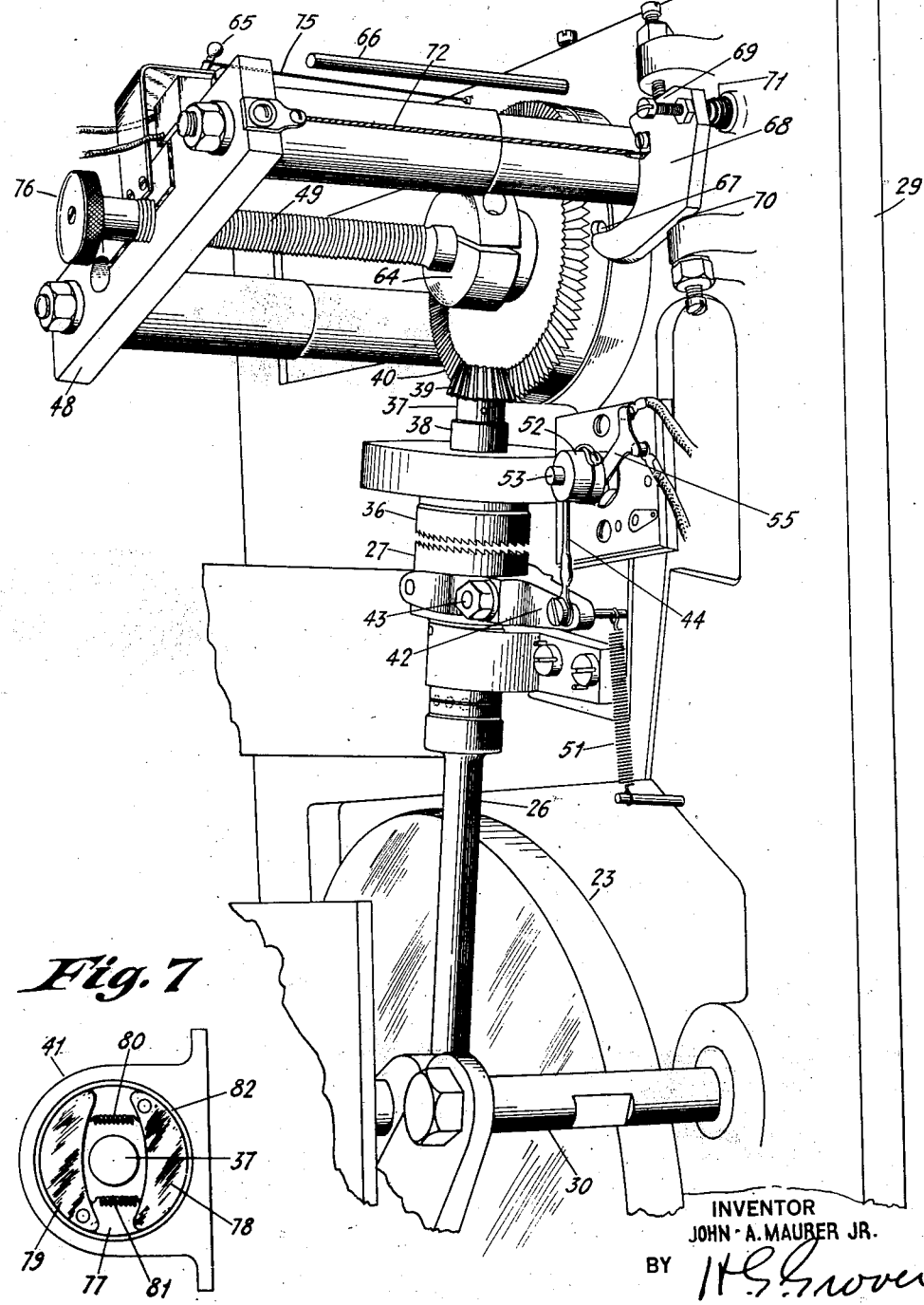

Dec. 20, 1932.  J. A. MAURER, JR  1,891,389
REPRODUCTION OF SOUND
Filed Oct. 28, 1931  5 Sheets-Sheet 5

INVENTOR
JOHN A. MAURER JR.
BY
ATTORNEY

Patented Dec. 20, 1932

1,891,389

UNITED STATES PATENT OFFICE

JOHN A. MAURER, JR., OF NEW YORK, N. Y., ASSIGNOR TO RADIO CORPORATION OF AMERICA, A CORPORATION OF DELAWARE

REPRODUCTION OF SOUND

Application filed October 28, 1931. Serial No. 571,534.

This invention relates to the reproduction of sound recorded on a photographic strip, and has for its principal object the provision of an improved sound reproducer which is especially adapted to reproduce sound from a sound track recorded on an endless film in the form of a helix.

Figure 2:
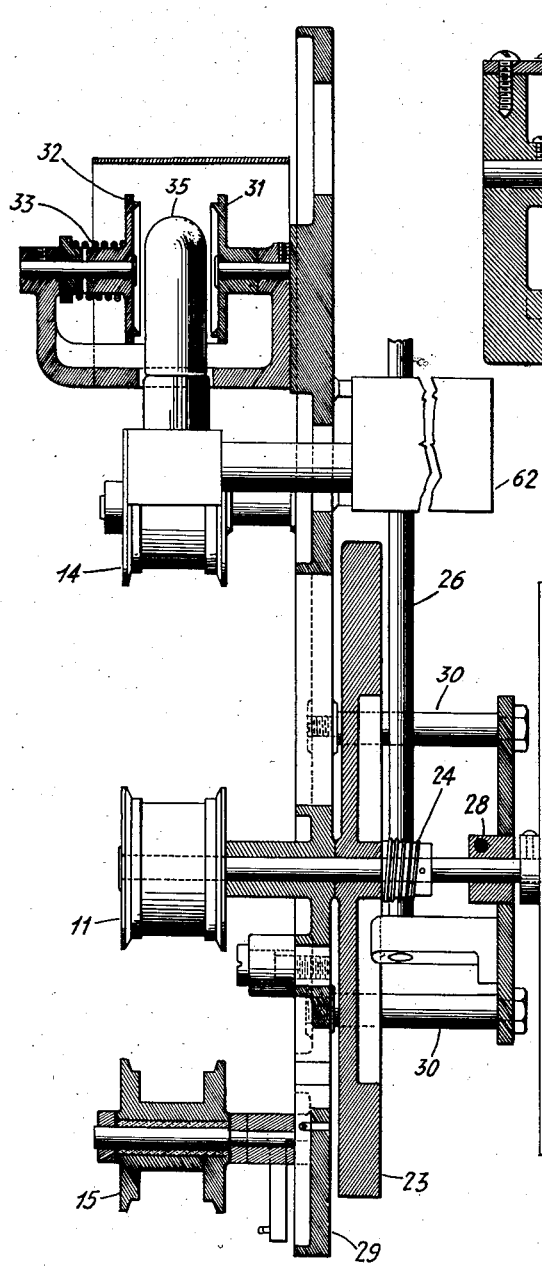
Figure 3:
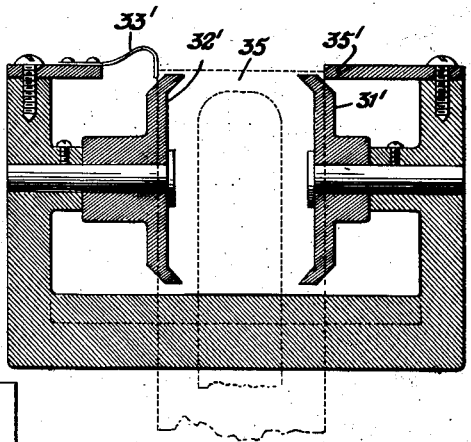

A sound reproducer of this general type is disclosed in Figs. 2, 3 and 4 of a Patent 1,776,123 granted on September 16, 1930 to J. C. Kroesen. The present invention is in some respects an improvement of the reproducing apparatus disclosed by this patent.

Among the various problems encountered in the construction of a practical apparatus of this type are the driving of the film smoothly without employing excessive tension or pressure rollers bearing on the edge of the film, the maintaining of the film in a definite lateral position without appreciable side weave, the retention of the film in a straight line at the point of translation where it is scanned by the light beam, the transmitting of light between a source and a photo cell which are moved relatively to one another, and the shielding of the photo cell from the extraneous light and the stray electric fields which tend to produce hum voltages.

In microphotographic sound recording where the sound track width is of the order of two mills and its adjacent turns are spaced from one another by a distance of the order of four mills, the solution of these problems involves great difficulty from a practical viewpoint. The manner in which these various difficulties have been overcome will be apparent upon consideration of the following description when considered in connection with the accompanying drawings and the particular features through which a highly successful operation of the apparatus in the reproduction of microphotographically recorded sound is secured will be pointed out in the appended claims. It will be apparent however that various features of the invention are not restricted in their usefulness to the reproduction of microphotographic sound records but may be utilized in connection with records of larger dimensions.

Figure 1:
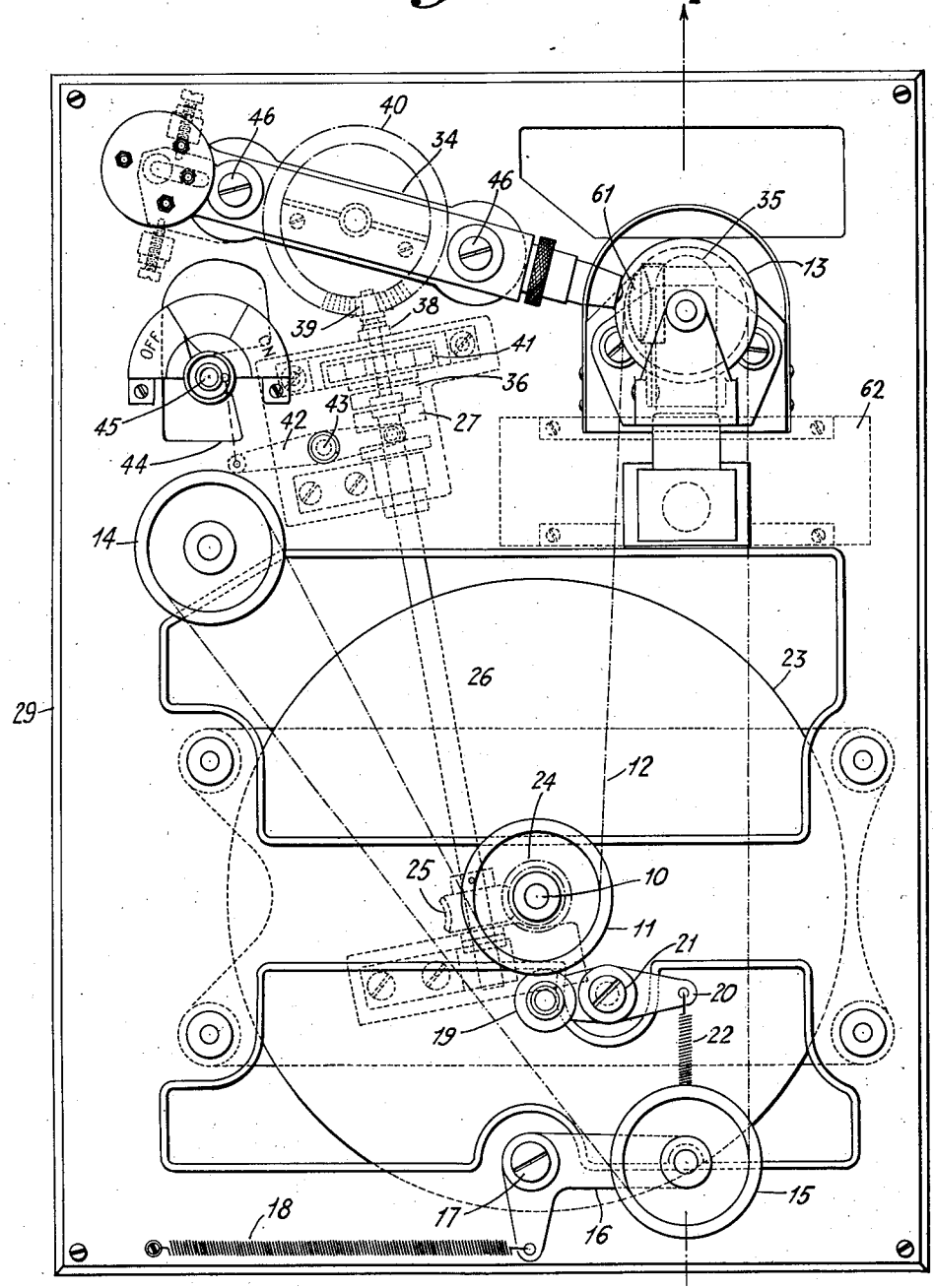
Figure 10:
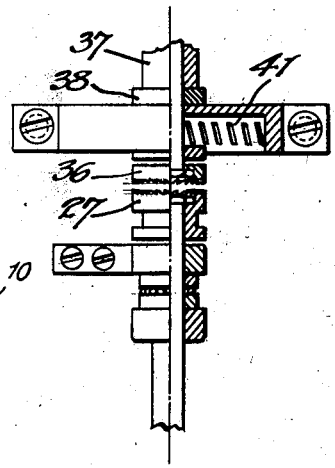
Figure 9:
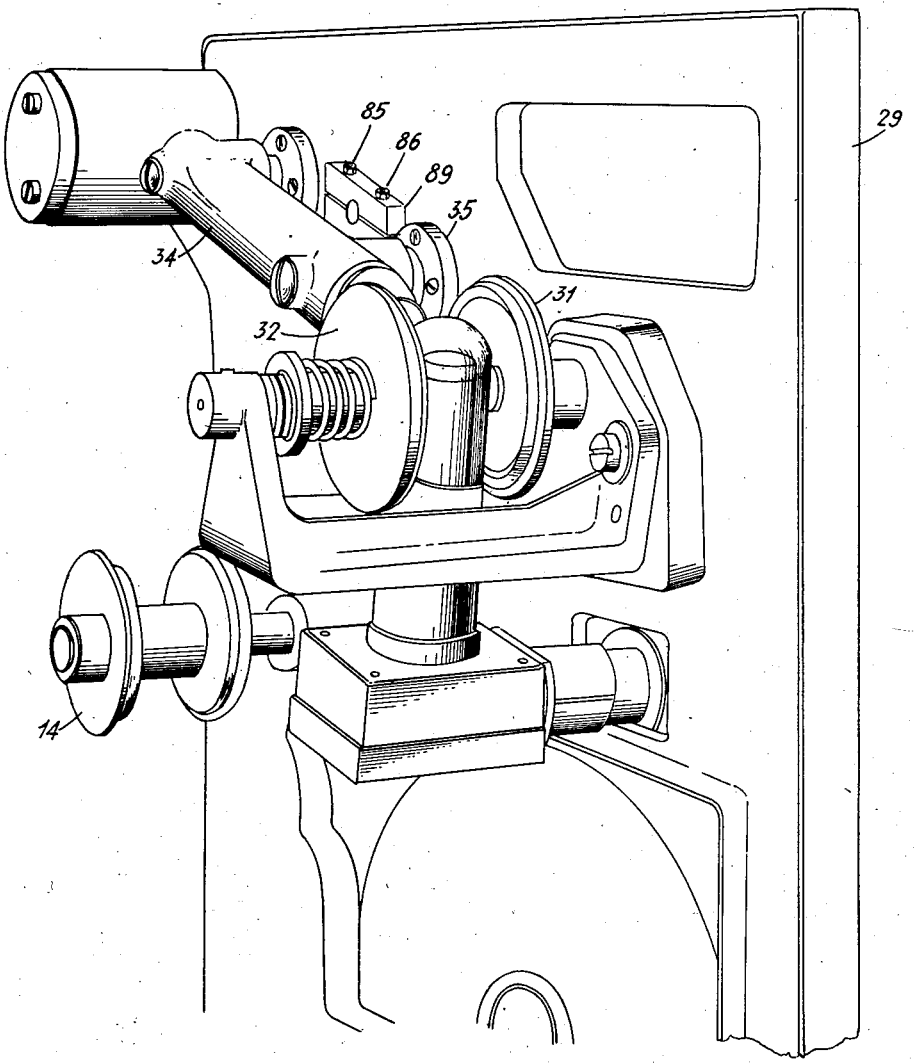

Referring to the drawings:

Fig. 1 is a side elevation view of a sound reproducing apparatus wherein my invention has been embodied, Fig. 2 illustrates certain details of this apparatus, Fig. 3 illustrates a modified form of support for the film at the translation point, Fig. 4 illustrates a mechanism by which the optical system is moved transversely of the film, Fig. 5 is a perspective view of the apparatus at the sound take-off point or point of translation, Figs. 6 and 6A are vertical section views showing details in the construction of the bearings of the mechanism illustrated by Fig. 4, Fig. 7 illustrates a form of brake mechanism by which return of the optical control mechanism to its starting point is controlled, Fig. 8 is another view of the mechanism through which movement of the optical system is controlled, Fig. 9 is a perspective view illustrating certain details of the optical system, the photo cell and the film support at the point of translation, and Fig. 10 is a partial sectional view of the clutch mechanism through which operation of the apparatus is controlled.

Attention is called to the fact that the broader aspects of the frictionally driven film and movable optical system combination are covered in a copending application Serial No. 571,533, filed October 28, 1931, and assigned to the same assignee as the present application.

As illustrated by Fig. 1 the apparatus includes a main drive shaft 10 upon which is mounted a flanged roller 11 for driving a film 12 which is threaded around a split roller idler 13 at the point of translation, an idler roller 14, and an idler roller 15 mounted on the right hand end of a bell crank 16 which is pivoted at 17 and is biased downwardly by a spring 18 for the purpose of maintaining the film taut. Although not essential to satisfactory operation of the apparatus a rubber tired pressure roller 19, mounted on an arm 20 which is pivoted at 21 and held against the roller 11 by a spring 22, may be provided for holding the film closely in contact with the raised edge surfaces of the roller 11. In the practical use of the invention it is found that the film tension is usually sufficient to obviate the need of this pressure roller.

Also mounted upon the shaft 10 are a fly wheel 23 and a worm gear 24 arranged to cooperate with a gear 25 which is mounted on a shaft 26 and is operatively coupled to the lower member 27 of a clutch through which operation of the mechanism for moving the optical system is controlled. As shown more clearly in Fig. 2 the shaft 10 is provided with a bearing 28 which is supported upon the base member 29 through rods 30 which are so arranged as to be beyond the periphery of the fly wheel 23.

The split roller 13 over which the film passes at the takeoff point or at the point of translation includes a flanged disk or drum 31 which is fixed in an axial direction and a similar member 32 which is biased against the edge of the film by a spring 33, and is permitted a limited range of movement axially. It will be noted that the drums are each provided with an inwardly extending flange for supporting the edges of the film as it moves past the point of translation between the objective of the optical system 34 and the photo cell 35 and that the outer edge of each flange is beveled to facilitate reception of the film. The spring pressed drum 32 has the advantage that the edge of the film is constantly maintained against the drum 31 and weaving of the film is prevented. A somewhat simplified structure for accomplishing the same purpose is shown by Fig. 3, the various features of which will be readily understood. In this arrangement the flanged disks 31 and 32 are replaced by the disks 31' and 32' and a resilient member 33' is provided for holding the film edge in contact with a fixed guide 35'.

As indicated by Figs. 1 and 8 the clutch member 27 is arranged to cooperate with a similar member 36 mounted on a shaft 37 which is supported in a bearing 38 and is provided at its upper end with a gear 39 which cooperates with a gear 40 loosely mounted on a lead screw 49 which moves the optical system 34 and coupled to this screw through a collar 64. Also mounted on the shaft 37 in connection with the bearing 38 is a governor 41 which, as hereinafter explained, is provided for the purpose of controlling the speed at which the optical system is automatically returned to its starting point. It will be observed that movement of the clutch member 27 into engagement with its cooperating member 36 is controlled by a lever 42 pivoted at 43 and provided at its left hand end with a control member 44 arranged to be moved by a control knob 45 which also controls the connections of various electrical circuits of the apparatus.

As shown more clearly in Fig. 4 the optical system 34 is supported upon a pair of rods 46 which are arranged to move in bearings or sleeves 47 and are connected at their opposite ends to a member 48. Movement of the rods 46 in the bearings 47 is effected by rotation of the lead screw 49 which is threaded into the member 48 at one end and is provided with a bearing 50 at the other end, rotation of the lead screw being controlled through collar 64, the gears 39 and 40, the clutch members 27 and 36 and the gears 24 and 25.

It should be noted that the lower clutch member 27 is biased to its open position by a spring 51 and is moved into its closed position by rotation of a cam 52 mounted on the same shaft 53 as the control knob 45 and connected to the movable clutch member 27 through link 44. Also mounted on the same shaft 53 as the cam 52 is a movable contact member 55 through which the electrical connections of the motor which drives the main shaft 10, the amplifier 62 (see Fig. 1) which is controlled by the photo cell 35 and the exciter lamp of the optical system 34, are controlled. The details of the clutch mechanism are shown in Fig. 10.

The optical system 34 includes an exciter lamp 56 (see Fig. 4) from which light is transmitted to the photo cell 35 through a condenser lens 57, a light slit 58, an aperture 59 and objective 60. The objective 60 is preferably made to have a comparatively large numerical aperture so that the angle of convergence of the rays at the image layer of the film is large and the noise which tends to be produced by dust on the outside surfaces of the film is minimized as set forth in a copending application of Byron E. Eldred. Serial No. 562,900, filed Sept. 15, 1931 and assigned to the same assignee as the present application. It also has the advantage that greater concentration of light at the image surface of the film is realized.

The aperture 59 is a novel feature in an optical system of the type described above and will be covered in a subsequent application. It functions to limit the dimensions of the light beam transversely of the film and to restrict the light beam to the two mill sound track in connection with which this apparatus has had its principal use.

In order to ensure that light from the optical system 34 is properly introduced into the photo cell 35 during movement of this system, a spherical lens 61 is interposed between the photo cell and the path followed by the film around the peripheries of the split roller 13. It will be noted that the diameter of this lens 61 is made comparatively large so that throughout the entire range of movement the light is properly directed into the photo cell.

In the assembly of the optical system 34, the double convex lens 57 is so positioned as to image the filament of the exciter lamp 56 in the rear of the objective 60 which is next the film. The light slit 58 is of rectangular shape and may be twenty one-thousandths of an inch by sixty one-thousandths of an inch. The objective 60 may have a focal length of eight millimeters. Under these conditions, the image of the slit 58 is reduced in the ratio of 20 to 1. The high numerical aperture of the eight millimeter objective 60 has the advantage that it permits the concentration of a large amount of light in a given area of the small sound track.

The operation of the mechanism through which the optical system is moved in one direction during reproduction of the sound record and is automatically returned to the starting point upon completion of the record will be described in connection with Figs. 6 and 8.

As previously indicated the gear 40 is coupled to the lead screw 49 by means of the collar 64. Assuming that the mechanism is in its starting position as illustrated in Figs. 6 and 8 and that the control knob 45 (Fig. 1) is in its "on" position thus moving the clutch member 27 (Fig. 8) into engagement with member 36 and closing the switch 55 whereby the circuits of the drive motor, the amplifier 62, and the exciter lamp 56 are completed, the optical system 34 is moved transversely of the film 12 which modulates the light reaching the photo cell 35.

When the light beam reaches the end of the sound record, the mechanism is automatically stopped by a switch (Fig. 8) which is connected in the motor circuit and is opened by engagement with a member 66 mounted on the back of the support 29.

When the control knob 45 is turned to its "off" position, the optical system is automatically returned to its starting position by means of a spring 74 which is located within the gear 40 and is so arranged as to be wound up during the playing of the record. The exact position at which the optical system comes to rest, that is, its starting position for playing the next record, is determined by a stop 67 mounted on the periphery of the gear 40 and arranged to cooperate with a member 68 pivoted at 69 and 70. This pivotally supported member 68 is biased out of engagement with the stop 67 by a spring 71 but at the end of the movement is pulled into engagement with the stop by a bronze cable member 72 adjustably attached to the member 48. Closure of the switch 65 at the starting point is effected by a flexible coupling 75 between the switch and the support 29.

Adjustment of the starting position of the optical system is effected by loosening keyed collar 64; then, while holding the gear 40 so that the stop 67 is in contact with the catch 68, rotating the screw 49 by means of a thumb screw 76 until the desired poistion is reached.

The return of the optical system to its starting point is controlled by the governor mechanism 41 which is shown in Fig. 7. This mechanism includes a member 77 fixed to the shaft 37 and provided with members 78 and 79 pivoted to it as shown, these pivoted members being biased to their illustrated position by means of springs 80 and 81 and being operated by centrifugal force into engagement with a collar 82 when the speed becomes excessive.

In order to produce smooth action of the optical system, particular attention is paid to the mounting of the guide rod bearings 47 and to the lead screw bearings 48 and 50 the details of which are illustrated by Figs. 6 and 6A.

Parallelism of the bearings 47 is ensured by scraping flat the surfaces of the support 29 on which they are mounted. Since clearance is provided in the holes through which the guide rods are attached to the optical system 34 and the bearing member 48, precise spacing of the bearings 47 is not necessary. This part of the structure is therefore self-aligning and is readily assembled.

As shown by Fig. 6, the bearing member 48 is bifurcated throughout a part of its length, a screw 83 and a spring 84 being arranged to compress the free leg so that the threads of the member 48 is resiliently pressed against the cooperating threads of the lead screw 49. The bearing 50 (Figs. 4 and 6A) is V-shaped and is likewise subjected to resilient pressure by means of screws 85 and 86 and springs 87 and 88 which maintain the upper bearing member 89 in contact with the bearing surface of the lead screw. By this method of support, end play of the lead screw is eliminated and all wear of the moving parts is made symmetrical, the end thrust of the gear 40 being taken up by the contiguous surface of the member 29.

While the present invention is not limited to particular film speeds or to sound tracks of specific characteristics, it has been found to work very satisfactorily when the drive pulley 11 is driven at 80 R. P. M. with surface speed of 45 feet per minute. With a gear reduction of 100 to 1 between the drive shaft 10 and the lead screw 49 and with a lead screw pitch of twenty threads per inch, the optical system is moved four one-thousandths of an inch for each four and one-half feet of movement of the film. The manner in which the apparatus must be modified to adapt to different speeds will be readily understood in view of the foregoing explanation.

Having thus described my invention what I claim is:

1. The combination of a record support, record driving means, a light source, a mechanism for moving said source transversely of said support, and coupling means including a clutch interposed between said driving means and said mechanism.

2. A sound reproducing apparatus including a record support, a light source, a mechanism for moving said source relatively to said support, driving means, coupling means including a clutch interposed between said driving means and said mechanism, and a single control element arranged to operate said clutch and to change the electrical connections of said source and said driving means.

3. The combination of a record support, a light source, a mechanism arranged to move said source relatively to said support, driving means, coupling means including a clutch interposed between said driving means and said mechanism, a photo cell arranged to receive from said source of light modulated by a record moved over said support, means for amplifying the current of said cell, and a single control element arranged to operate said clutch and to change the electrical connections of said driving means, said source and said amplifier.

4. The combination of a record support, record driving means, a light source, a mechanism for moving said source relatively to said support, coupling means interposed between said driving means and said mechanism, and means for deenergizing said driving means when said source has moved through a predetermined distance.

5. The combination of a record support, record driving means, a light source, a mechanism for moving said source, and means for deenergizing said driving means when said mechanism has moved a predetermined distance.

6. A sound reproducing apparatus including a record support, record driving means, a light source, a mechanism for moving said source during the playing of a record, and means for automatically returning said source to its starting point when said record is played.

7. A sound reproducing apparatus including a record support, record driving means, a light source, a mechanism for moving said source during the playing of a record, means for returning said source to its starting point when said record is played, and means for changing an electrical connection of said driving means upon the return of said source to its starting point.

8. The combination of a record support, record driving means, a light source, and means including a lead screw mounted in bearings maintained in resilient contact with its bearing surfaces for moving said source relatively to said support.

9. The combination of a record support, record driving means, a light source, means including a lead screw mounted in bearings maintained in resilient contact with its bearing surfaces for moving said source relatively to said support, and means for adjusting the starting point of said source.

10. A sound reproducing apparatus including a record support, record driving means, a light source, a mechanism for moving said source during the playing of a record, means for automatically returning said source to its starting point when said record is played, and means for braking the return movement of said source.

11. The combination of means for movably supporting an endless film loop bearing a record arranged in a helical path, a light sensitive cell mounted within said support means, a light source arranged to be moved relatively to said support for projecting light into said cell along said path, and means operable to move said loop at a speed independent of changes in its dimensions.

12. The combination of means for movably supporting an endless film loop bearing a record arranged in a helical path, a light sensitive cell mounted within said support, a light source arranged to be moved relatively to said support for projecting light into said cell along said path, and a relatively large lens interposed between said record and said cell for directing said light into said cell.

13. The combination of film supporting means including a drive pulley, means including a split idler for supporting said film, means for resiliently holding the opposite portions of said idler against the edges of said film, and a resiliently supported idler for maintaining said film under tension.

14. The combination of film supporting means including rotatable members spaced from one another, resilient means for preventing sidewise movement of said film on the peripheries of said members, and a light sensitive cell mounted between said members.

15. The combination of film supporting means including rotatable members spaced from one another, resilient means for preventing sidewise movement of said film on the peripheries of said members, a light sensitive cell mounted between said members, and a resiliently supported roller for maintaining said film in close contact with the contact surfaces of said members.

16. The combination of film supporting means including rotatable members spaced from one another, resilient means for preventing sidewise movement of said film on the peripheries of said members, a light sensitive cell mounted between said members, a resiliently supported roller for maintaining said film in close contact with the contact surfaces of said members, and means including a movable optical system for directing light through said film into said cell.

17. The combination of film supporting means including a hollow support, an optical system arranged to be moved relatively to said support and provided with an objective having a focal length of the order of a few millimeters, and a light sensitive cell arranged within said support to receive light from said system through said film.

18. The combination of film supporting means including a hollow support, an optical system arranged to be moved relatively to said support and provided with an objective having a focal length of the order of a few millimeters, a light sensitive cell arranged within said support to receive light from said system through said film, and means interposed between said film and said cell for directing said light into said cell.

19. The combination of film supporting means including a hollow support, an optical system arranged to be moved relatively to said support and provided with an objective having a focal length of the order of a few millimeters, a light sensitive cell arranged within said support to receive light from said system through said film, and a resiliently supported member for maintaining said film in close contact with the contact surfaces of said member.

JOHN A. MAURER, Jr.